(12) United States Patent
Cacace

(10) Patent No.: US 9,346,093 B2
(45) Date of Patent: May 24, 2016

(54) METHODS FOR THE PRODUCTION OF CLAD STEEL PRODUCTS

(75) Inventor: Antonino Giorgio Cacace, West Glamorgan (GB)

(73) Assignee: CLADINOX INTERNATIONAL LIMITED, Seychelles (AU)

( * ) Notice: Subject to any disclaimer, the term of this patent is extended or adjusted under 35 U.S.C. 154(b) by 288 days.

(21) Appl. No.: 14/009,706

(22) PCT Filed: Apr. 5, 2012

(86) PCT No.: PCT/GB2012/000325
§ 371 (c)(1),
(2), (4) Date: Oct. 3, 2013

(87) PCT Pub. No.: WO2012/143668
PCT Pub. Date: Oct. 26, 2012

(65) Prior Publication Data
US 2014/0037979 A1      Feb. 6, 2014

(30) Foreign Application Priority Data

Apr. 18, 2011   (NZ) ........................................ 592302

(51) Int. Cl.
| | | |
|---|---|---|
| *B21D 39/04* | (2006.01) | |
| *B21D 11/00* | (2006.01) | |
| *B21C 33/00* | (2006.01) | |

(Continued)

(52) U.S. Cl.
CPC .............. *B21D 11/00* (2013.01); *B21C 33/004* (2013.01); *B21C 37/042* (2013.01); *B21D 39/04* (2013.01); *B21J 1/02* (2013.01); *B32B 15/01* (2013.01); *B21D 39/046* (2013.01); *B21D 39/048* (2013.01); *B32B 15/011* (2013.01);

(Continued)

(58) Field of Classification Search
CPC .... B21D 39/04; B21D 39/044; B21D 39/046; B21D 39/048; Y10T 29/49927; Y10T 428/12979; B32B 15/011; C21D 8/065; C21D 2251/02; C22C 9/06
See application file for complete search history.

(56) References Cited

U.S. PATENT DOCUMENTS 3,762,025 A    10/1973   Gottlieb et al.
4,162,758 A *  7/1979   Mikarai ................ B21C 37/154
                                               228/131

(Continued)

FOREIGN PATENT DOCUMENTS

EP           0 348 381        12/1989

OTHER PUBLICATIONS

International Search Report, PCT/GB2012/000325, Jul. 20, 2012.

*Primary Examiner* — Jermie Cozart
(74) *Attorney, Agent, or Firm* — Young & Thompson

(57) ABSTRACT

A method is disclosed of producing a billet which can be heated and rolled or otherwise worked with conventional equipment to form a product with a steel core and a cladding of an alloy including stainless steel, nickel-chrome, nickel-copper or copper-nickel. For a product such as corrosion resistant reinforcing bar, the billet includes a solid steel core inserted in a tube of the alloy on which swaging operations are carried out, decreasing the transverse size of discrete portions of the tube. The part of the tube interfacing with the steel body may be swaged, increasing the length of the tube and decreasing the transverse size of the steel body at the interface. To prevent oxidation of chrome and other metals in the tube, one or more briquettes of scavenging metal are inserted in the parts of the tube that project clear of an end of the core.

17 Claims, 8 Drawing Sheets

Figure 1:
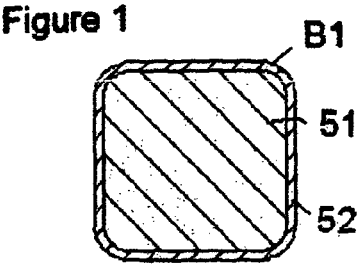

(51) Int. Cl.
  *B21J 1/02* (2006.01)
  *B21C 37/04* (2006.01)
  *B32B 15/01* (2006.01)
(52) U.S. Cl.
  CPC ....... *C21D2251/02* (2013.01); *Y10T 29/49927* (2015.01); *Y10T 428/12229* (2015.01)

(56) References Cited

U.S. PATENT DOCUMENTS 6,706,416 B1  3/2004  Cacace
2009/0269605 A1* 10/2009  Warke ................... B21C 23/22
                                                  428/550

* cited by examiner

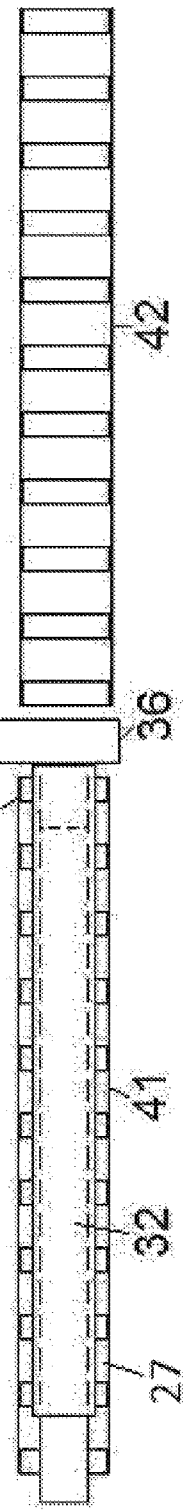
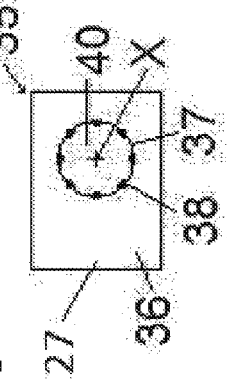
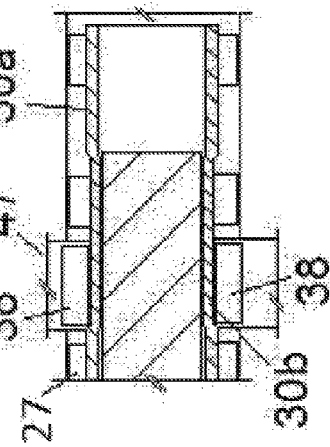
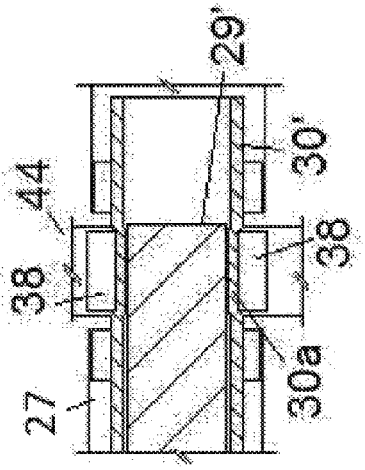

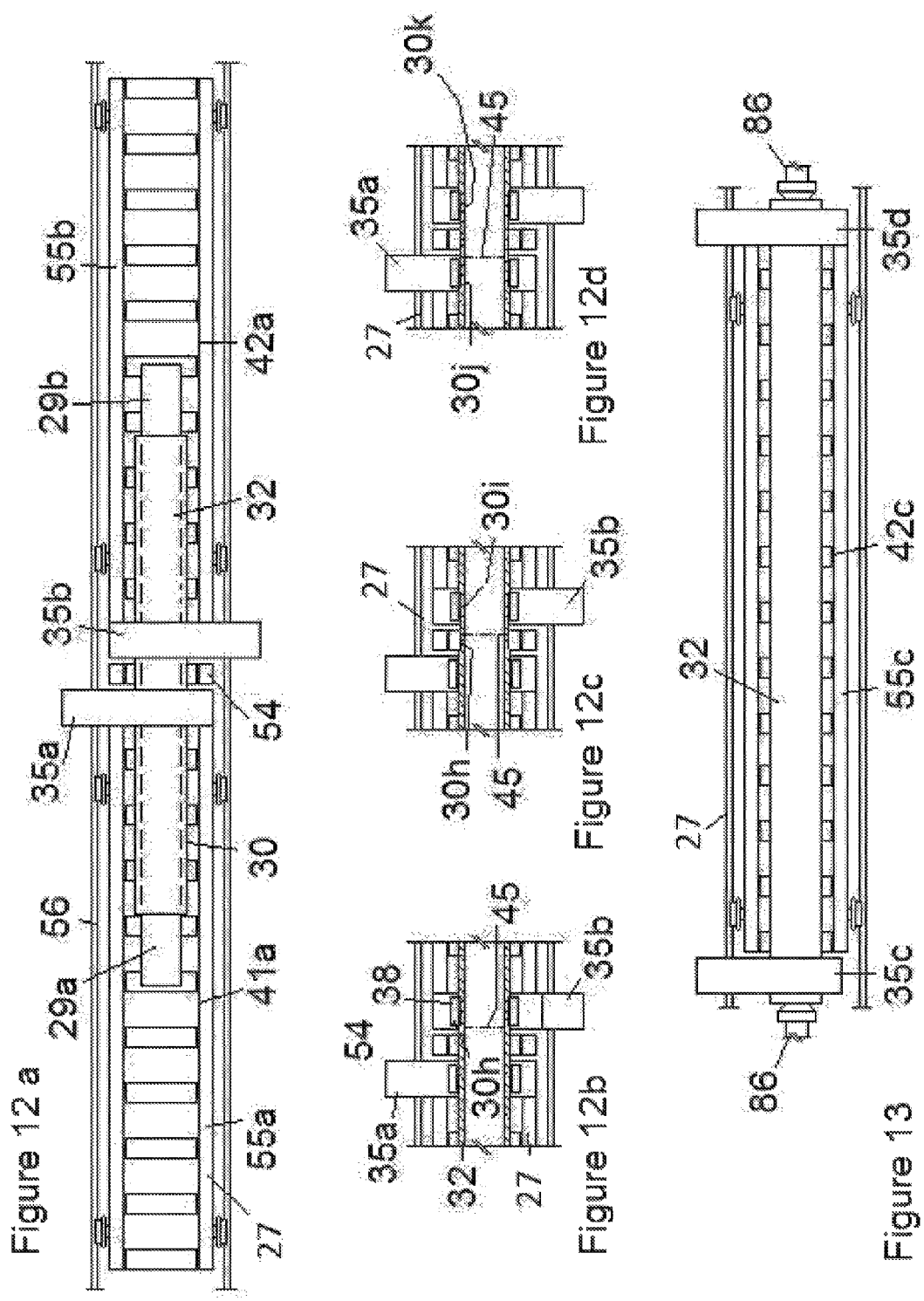

METHODS FOR THE PRODUCTION OF CLAD STEEL PRODUCTS

FIELD OF THE INVENTION

This invention relates to a process for the manufacture of corrosion resistant metal products and to products produced from the process. The invention has particular but not exclusive application to products comprising a core of corrosion susceptible steel to which is applied a cladding comprised of stainless steel, nickel-chrome alloy, nickel-copper or copper-nickel alloy. It is also intended that the invention should cover billets for use in such methods since there may be a market for such billets.

The susceptibility to corrosion of what are commonly simply called "steels" that are most often used in industry is well known and should not require further discussion. Conversely, the corrosion resistant properties of stainless steels and the aforementioned alloys are equally well known. This invention applies, in principle, to any product that is composed of a body of steel that is significantly more susceptible to corrosion than stainless steel or the aforementioned alloys and that is susceptible of having applied to it a cladding of these materials by the techniques described herein. In this specification, the term "steel" used by itself will refer to such a steel unless it is clear from the context that this is not intended. In particular, it is intended that the term "steel" should cover what are commonly called carbon steels. According to convention, and as used herein, the term "carbon steel" covers the various grades of thereof, including mild steels, low alloy engineering steels and micro-alloy steels.

The terms "stainless steel", "nickel-chrome alloy" and "nickel-copper alloy" are names that are well known in the metal industry and are generally applied to a range of alloys containing, respectively, significant amounts of chrome, nickel and chrome, and copper and nickel. In nickel-copper alloys there is more nickel than copper, in contrast to "copper-nickel alloys" in which the proportions of nickel and copper are reversed. Ranges of alloys under each of the four names appear in lists available from the major producers thereof. In this specification, the term "alloys contemplated herein" refers to any of these alloys, unless it is clear from the context that this is not intended.

In this specification, the following abbreviations are used in order to avoid excessive repetition:
SS=stainless steel
NiCr=nickel-chrome alloys
NiCu=nickel-copper alloys
CuNi=copper-nickel alloys
RT=Starting Rolling Temperature Range
RTa=RT for: austenitic SS/NiCr: 1230-1280° C.
RTd=RT for: duplex/ferritic SS/NiCu/CuNi: 1100-1200° C.
FD="finely divided" in the sense defined below.

BACKGROUND OF THE INVENTION

U.S. Pat. No. 6,706,416 and a number of earlier patents referred to therein, including U.S. Pat. No. 5,051,315, all to Cacace and referred to herein as the "earlier Cacace" patents and processes, deal with a method of producing SS-clad steel products. In these earlier Cacace patents, a billet is prepared by progressively compressing carbon steel swarf into briquettes in a round SS tube. On perusal of these patents it seems clear that the achievement of a satisfactory metallurgical bond at the interface between the SS cladding and the core of briquetted swarf has been problematical. The root of the problem is the occurrence of oxidation of chrome in the stainless steel at the interface. U.S. Pat. No. 6,706,416 discloses a process of dealing with this oxidation. This is possibly the reason that, as far as the applicant is aware, the process is the only one for producing SS clad reinforcing bar that has been in recent commercial use.

There are significant disadvantages to the use of a billet that is produced by compressing swarf into the SS tube. The production of such a billet would require costly specialised machinery, an example of which is described in U.S. Pat. No. 5,088,399 (one of the earlier Cacace patents). Most modern mills cannot roll round billets. They are designed to roll square billets that can be up to 15 m long and are typically 130 mm to 150 mm in cross sectional size. The billets described in the earlier Cacace patents are round and are about 2 m long× 100 mm in diameter. This is likely to be close to the maximum size that machinery for producing billets by compressing swarf into a tube can deal with. Only a limited number of existing rolling mills are able to roll billets of such short length and there are even fewer that can also roll from a round billet. A major advantage of the present process is that the billet size can be chosen to suit an existing rolling mill.

Although in principle the size and length of billets that comprise swarf compressed into the SS tube could be increased, and the shape changed, the technical problems involved in achieving suitable machinery for this purpose might well be insuperable.

It is one object of the invention to provide a method that enables billets to be produced whose length, size and shape enable them to be rolled in existing rolling mills.

International patent applications no. PCT/GB2010/001932, PCT/GB2010/001933 and PCT/GB2010/001934 to Cacace (which will be referred to herein respectively as "Cacace 1932", "Cacace 1933" and Cacace 1934") deal with methods of producing a composite billet consisting of an alloy cladding on a solid steel core. The technology disclosed in these applications is directed to dealing with problems and disadvantages associated with methods of producing such products disclosed in various earlier patents.

GB 2085331 (Sumitomo), EP 225983 (Mitsubishi) and EP 59070 (Spencer Clark) each disclose methods of producing clad steel products from billets comprising a solid steel body in a SS tube. However, none of these disclosures make any reference to the aforementioned problem of oxidation of the chrome in the SS. The applicant believes that such oxidation would be seriously detrimental to the bond between the core and the tube in the finished product and would result in a commercially unacceptable clad steel product.

In Cacace 1932/3/4, techniques are disclosed for preventing this oxidation. The tube projects clear of each end of the solid core bar and the techniques envision the placement of a mass of finely divided scavenging metal such as aluminium, titanium or magnesium in the tube adjacent the ends of the core bar. The ends of the tube are sealed to prevent oxidising gases from entering the billet when it is heated and rolled. The technique proposes heating the ends of the billet before the core is heated so that the scavenging metal becomes active to scavenge residual oxygen in the billet before oxidation of the chrome in the tube can occur.

Notwithstanding the provision of the scavenging metal, it is stated that it is necessary to ensure that the tube fits closely around the core. To this end, the tubes disclosed in Cacace 1932/3/4 can take various forms. In Cacace 1933, a prefabricated tube is used into which a core bar is inserted. The tube is then stretched beyond its elastic limit which has the benefit of permanently increasing the length of the tube and at the same time reducing the gap between the tube and the core bar.

However, the apparatus required for stretching on a commercial scale is likely to be relatively expensive. Furthermore, the tube needs to have portions at its ends that must be flared to enable them to be gripped by the stretching apparatus. These portions increase the length of the portions of the tube that are cut off after use and thus wasted. This adds to the expense of the billet, especially considering the high current cost of the alloys contemplated herein.

Another disadvantage of stretching the tube over the core bar is that a tube so stretched has only a limited ability to take up irregularities in the shape, particularly in the cross sectional profile, of the core bar. This disadvantage is significant when such objects as the so called 'near net shape' continuously cast billets or blooms produced, typically, by Siemens VAI Bloom-Beam Blank Casting Technology, or even used axles or the head, flange, or web portions of used rails, are used for the core bar. The same disadvantages could apply to a core that is fabricated from one or more elongate components packed together so as to result in an irregular or asymmetrical cross sectional shape.

In Cacace 1932/4, each tube can be fabricated from one or more elongate components that are welded together after being placed around the core bar. Where the core bar has a square cross sectional profile, the components may be flat or may be square tubes, angle sections or channel sections shaped so as to conform to part or whole of the profile.

It is one object of the present invention to provide an alternative technique for reducing the gap between the tube and the core bar.

Cacace 1932/3/4 propose that, in some cases, the entire tube, including the projecting ends, is of SS or one of the other alloys contemplated herein. However, these alloys are costly and it is desirable to minimise the quantity thereof that is used to make up a tube. To this end, in some cases, the alloy portion of the tube terminates short of the ends of the core bar and the ends of the tube are made up of steel sleeves which are welded to the alloy portion.

The steel sleeves proposed in Cacace 1932/3/4 reduce the amount of alloy that is discarded in this manner. However, the welds that join the steel sleeves to the alloy portion, and indeed welds anywhere in the tube, particularly near its ends, are a potential source of weakness in the tube. This is also true of the welds that fix in place closing plates are inserted in the overlying ends of the tube and welded in place to close the ends of the tube. When closed by such plates, the tube, whether or not it comprises the steel end pieces, forms a closed housing in which the core bar is sealed. The most common cause of oxidation of the metals at the interface has been found to be failure of such welds which are particularly vulnerable in billets which are not tapered at their ends. As is well known, so called "fish tails" are commonly formed in the ends of billets having non-tapered ends during rolling.

U.S. Pat. Nos. 5,051,315, 6,706,416 and Cacace 1934 propose that the tube ends can be "closed" using an apparatus that "crimps" each end into a star shape. Although the procedure reduces the size of the tube ends, thus facilitating entry of the billet into the rolls and reducing the possibility of weld failure in the proximity thereof, the tube ends are left with a star shape. Furthermore, it is clear from a perusal of each document that the tube ends are left substantially open in the heating furnace preparatory to rolling, and not sealed from the atmosphere by this procedure. In U.S. Pat. No. 6,706,416 reliance is placed instead on the presence of two additives in the swarf of the core, usually aluminium and ammonium chloride, to prevent oxidation of chrome in the alloy as aforesaid. The techniques disclosed in Cacace 1934 render the use of ammonium chloride unnecessary.

As described in detail below, the applicant has now found that significant and unexpected benefits arise from causing the tube ends to be tapered to a uniformly round or square shape and it is one object of the invention to achieve this end.

It should be clear that many descriptive terms found herein are used in the sense in which they are used the steel industry. Persons skilled in the art will thus be aware that, for example, a metal tube or bar that is described as 'square' will inevitably have corners that are rounded to some extent. For many purposes, metal bars and tubes are purposely formed with round corners and, to be commercially acceptable, many of the characteristics of such products, including the radius applied to the corners of bars and tubes, will be governed by authoritative specifications. To avoid excessive repetition, the following terms have the meanings indicated unless it is clear from the context that this is not intended:

"square bar" and "rectangular bar" include such bars having corners that are rounded in the course of production;
"square tube" and "rectangular tube" include square tubes and rectangular tubes having corners that are rounded in the course of production.

Further, although some of the descriptions are based on the use of a round cornered square bar inserted into a round cornered alloy tube, they could equally apply to the use of bars and tubes of any other suitable shapes including both round and out of round shapes, due account being taken of the differences in shape.

STATEMENTS OF INVENTION

In this specification the term "scavenge" implies the removal of gaseous oxygen, as opposed to "reduction" which implies the removal of oxygen from a compound that contains oxygen as one of its components.

In one aspect, the invention provides a method of producing a billet which can be heated and worked to form a metal product, the billet comprising a metal tube and a steel body that is inserted in the tube, the method including the steps of carrying out a swaging operation on the tube that cause the transverse size of at least a portion of the tube to decrease.

In one aspect, the invention provides a method of producing a billet which can be heated and worked to form a metal product, the billet comprising a metal tube and a steel body that is inserted in the tube, the method including the steps of carrying out swaging operations on discrete portions of the tube that cause the transverse size of at least one portion to decrease.

In one aspect of the invention, the tube is composed of an alloy selected from the group comprising stainless steel, nickel-chrome, nickel-copper and copper-nickel alloys.

It is believed that there is a market for billets that have been so swaged and are ready for finishing prior to being heated and rolled.

In one aspect of the invention, the swaging operations are carried out on a part of the tube that has an interface with the steel body.

In one aspect of the invention, the swaging operations cause the transverse size of a part of the steel body having the interface with the part of the tube that is swaged to be decreased.

In one aspect of the invention, the swaging operations cause the length of the tube to increase.

In one aspect of the invention, the method includes the step of placing at least one scavenging metal in a part of the tube that projects clear of an end of the steel body.

In one aspect of the invention, at least one portion that is swaged is located in the part of the tube that projects clear of the end of the steel body and is swaged to a transverse size that is smaller than that of the end of the steel body.

In one aspect of the invention, the swaging operations cause the wall thickness of at least one of the portions to increase.

In one aspect of the invention, the method includes the step of causing the tube to be sealed from the exterior of the billet.

In one aspect of the invention, an insert is located in the end of the part of the tube that projects clear of the end of the steel body, and that end is swaged in such manner against the insert as to impede gases outside the billet from entering the billet.

In one aspect of the invention, the insert is comprised at least in part of finely divided steel.

In one aspect of the invention, the insert is comprised at least in part of a mixture of finely divided steel and at least one scavenging metal in finely divided form.

In one aspect of the invention, the steel body has a bore in which is placed a second metal tube at least one end of which is sealingly joined to the tube in which the body is inserted.

In one aspect of the invention, the second metal tube is composed of an alloy selected from the group comprising stainless steel, nickel-chrome, nickel-copper and copper-nickel alloys.

In one aspect of the invention, the method includes the steps heating the billet, and working the billet to form a product having a cladding composed of the alloy.

It is intended that the scope of the invention extends to billets that are produced according to the methods set out herein.

The methods of the invention take advantage of the fact that the alloys contemplated herein are capable of a high degree of elongation when they are compressed. A stainless steel tube in which a core is inserted can deform inwardly by as much as 40% and can also increase in length by the same amount before it breaks. The elastic limit of the SS is reached well before the tube breaks and the cross sectional dimensions of the tube decrease permanently in proportion to the degree of elongation and compression. NiCr alloys containing less than 40% Cr are also capable of about 40% inward deformation and elongation. NiCu and CuNi alloys are capable of 35-60% inward deformation and elongation. So that any clearance or gap that exists between a steel bar and an alloy tube in which the bar is inserted will be reduced when the tube is stretched along its length or compressed radially inwardly. So that the clearance can be decreased by causing the tube to be stretched or compressed beyond its elastic limit.

The steel body may be a solid bar or hollow bar. Use of a solid bar would typically result in a hot rolled end product such as SS-clad rebar. Use of a hollow bar would typically result in a pipe that is produced by known techniques and which has an external cladding of stainless steel.

DESCRIPTION OF EMBODIMENTS OF THE INVENTION

Figure 25:
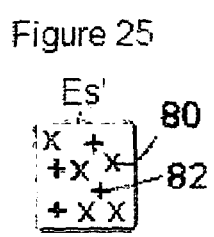
Figure 9A:
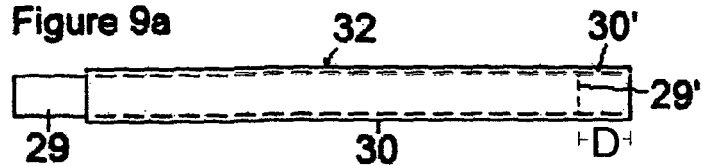
Figure 9B:
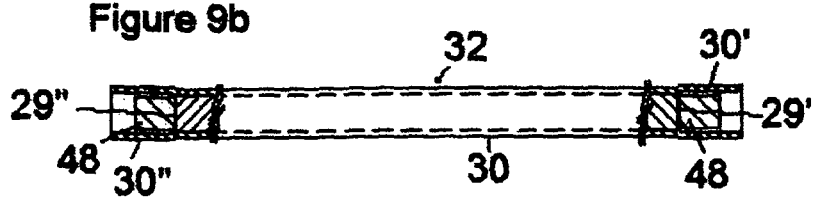
Figure 15A:
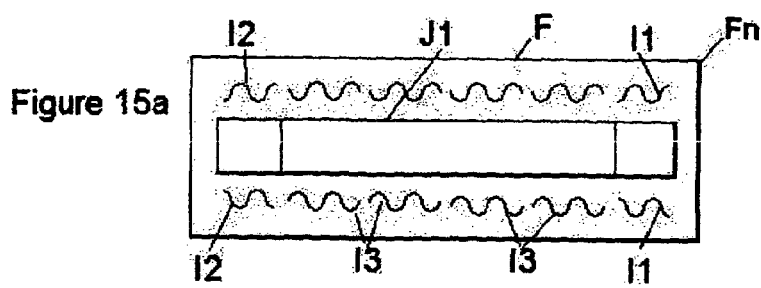
Figure 16:
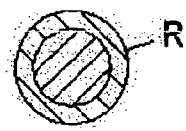
Figure 15B:
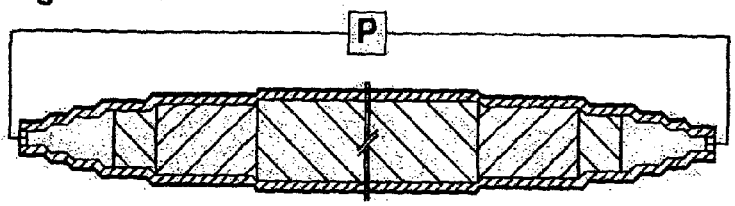
Figure 17:
Figure 18:
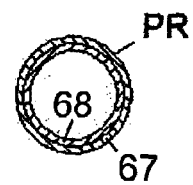

The invention is further discussed with reference to the accompanying drawings, in which:

FIGS. 1 to 8a show transverse cross sectional views of various billets;

FIGS. 9a-b show an assembly comprising a bar inserted in a tube;

FIGS. 10 to 13 are plan views of apparatus in various stages of swaging an assembly comprising a bar in a tube;

FIGS. 8b-e, FIG. 14a-e and FIGS. 19-22, 23-23a, and 24 show longitudinal views, most in part cross section, of various billets;

FIGS. 15a-b are schematic views of apparatus for heating and evacuating a billet;

FIGS. 16-18 show transverse cross sectional views of clad steel products produced by billets shown herein; and FIG. 25 is a diagrammatic illustration of a briquette.

The examples of billets prepared using the techniques of this invention and described in this specification are based on billets that can be up to 15 m long. Clearly, all of these dimensions are by way of example only.

In the work carried out by the applicant up to the present time in connection with the development of the invention, most of the billets have been comprised of core bodies of carbon steel and a cladding of A304 SS and UNS 532101 and 532304 duplex stainless steels. The embodiments of the invention described herein are therefore focussed on billets having a SS cladding. However, considering that nickel and copper have a higher "free energy of oxidation" (FEOF) than chrome, the applicant believes that the techniques of this invention can be successfully applied without significant modification to producing products comprising a steel core body that is clad with any of the alloys contemplated herein. In the present context, the FEOF provides a measure of whether, at any given temperature, the metal of which an element in the billet is composed will be oxidised in preference to chrome, nickel or copper in the cladding and thus prevent oxidation thereof. A diagrammatic illustration of the FEOF of various metals appears in the Ellingham diagram for the reaction of metals to form oxides. The Ellingham diagram is freely available in the interne and in technical literature.

Referring to the drawings, cross sections of several billets, and the preparation thereof, will first be discussed, each comprising a steel core inserted in a variety of tubes composed principally of one of the alloys contemplated herein. Means for reducing the size of the inevitable clearance gaps that occur at the interface between the cores and the tubes will then be described. Notwithstanding that the gaps have been so reduced, it remains necessary to exclude oxidising gases from the interior of the billets if bonding between the core and the SS jacket at the interface is to be satisfactory and means to prevent or reduce such oxidation will then be described.

In general, the drawings are not to scale. In particular and for clarity in the drawings, most of the billets illustrated are not drawn as long as they would in reality be relative to their transverse dimensions.

FIG. 1 shows the transverse cross section of a square billet B1 comprising a core in the form of a square bar 51 of solid steel in a square SS tube 52. The bar may have been inserted in a preformed SS tube. Alternatively, referring to FIG. 2, a SS strip or long SS plate 75 is preformed into a deep U- or channel-shape indicated in dotted outline at 75a. After a steel bar 76 is placed in the channel, the outer parts 75b of the flanges of plate 75 are bent over the top of the bar. The flanges are then rolled flat against the bar as shown at 75c and welded together at the gap 77, typically, but not necessarily exclusively, by the submerged arc process, to close the tube. Only one weld is required. The width of the plate or strip, when still flat, is such that, after being formed around the bar, the clearances between the juxtaposed faces of the bar and the tube formed from the plate or strip 75 are as small as possible.

Figure 3:
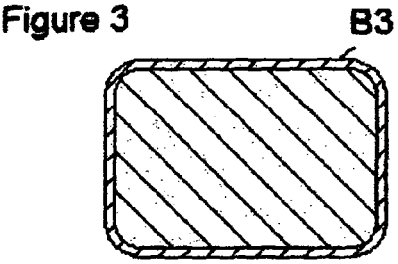

FIG. 3 shows a billet B3 that is similar in all respects to the billet B1, except that B3 is rectangular. It is suitable for producing angles, channels, flat bars, rails and universal beams. A billet B3 having suitable dimensions, such as those of a slab, could also be used to produce SS clad plates.

Figure 3A:
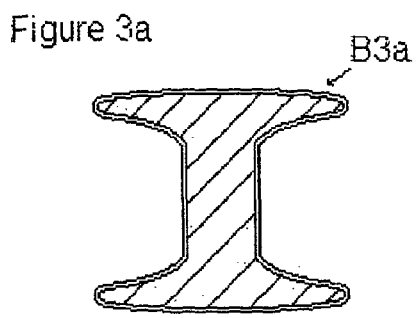

FIG. 3a shows a billet B3a of near net shape ("NNS"). This is a term used in the industry to describe the shape of a continuous-cast billet designed to be as near as possible in shape and size to that of the end product into which the billet is rolled, thereby minimising the size and number of rolling stands required to produce the end product. The NNS is formed at the start of casting by the shape of the mould into which molten steel is poured. Billet B3a is a so called "dog-bone" which is one example of an NNS. Dog-bones of various sizes are continuously cast as NNS billets for rolling into rails or universal beams.

Figure 4:
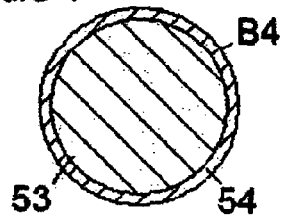

FIG. 4 shows a round billet B4 comprising a core in the form of a round steel bar 53 inserted in a round preformed SS tube 54.

In an alternative method of producing B4 and B1, the SS tube can be formed from a flat that is folded around, respectively, a round or square bar and welded closed in a pipe mill.

Both B1 and B4 are suitable for producing long products such as SS-clad angle bars and other sections, tie rods, ground anchors, round bars and flat bars.

Figure 5:
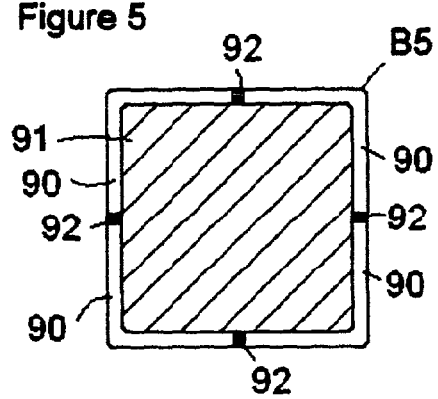

In another alternative, the billet B5 shown in FIG. 5 comprises four strips or plates 90 that are pressed into "L" or angle shape to fit closely around the four corners of a square steel bar 91 and then seam welded as shown at 92 to form a tube. Although welding operations are increased, the L-shaped plates can be shaped to fit around the square bar 91 very precisely, and it may not be necessary to press the flanges of the plates 90 against the bar when the abutting edges of the flanges are being welded together.

Figure 6A:
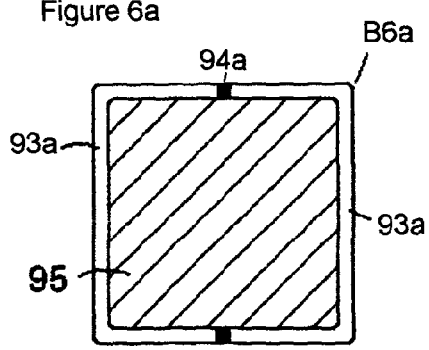
Figure 6:
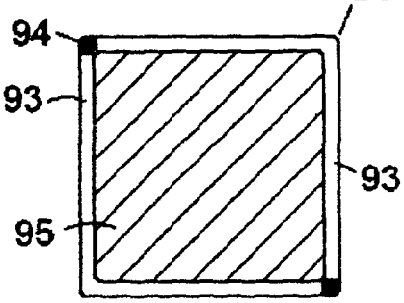

Similarly, in billet B6 shown in FIG. 6, two SS strips or plates 93, rolled or pressed beforehand into two 90° angle pieces, can be welded together at 94 after being placed over two corners of the bar 95.

In FIG. 6a, two SS strips or plates, rolled or pressed beforehand into two channel shaped pieces 93a, are welded together at 94a after being placed over two faces of the bar 95a.

Figure 2:
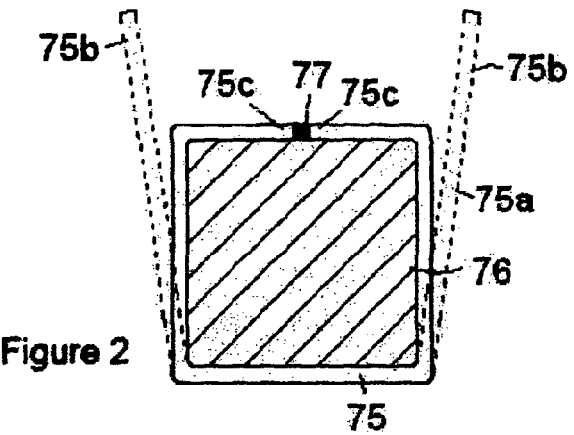

In FIGS. 2, 5 and 6a, the location of the welds is indicative. In some cases, it may be found preferable to locate the welds elsewhere than along the centres of the faces.

Figure 7:
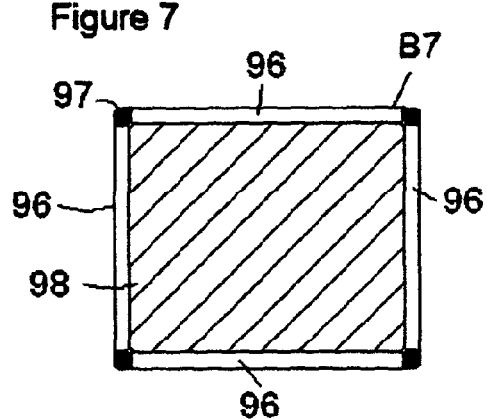

In billet B7 shown in FIG. 7, four flat SS strips or plates 96 can be placed against the four faces of the bar 98 and welded together adjacent the four corners of the bar as shown at 97. By way of illustrative example, the bar 98 is in this case rectangular. It could of course be square.

Figure 8A:
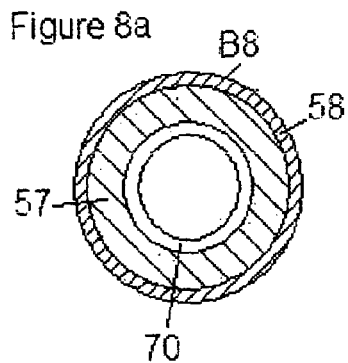
Figure 8C:
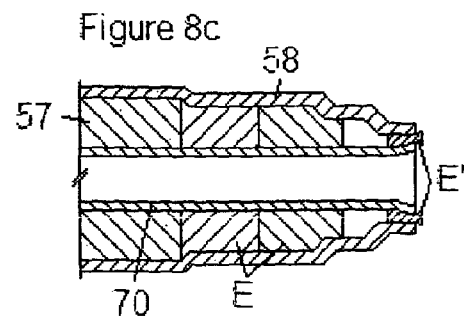
Figure 8B:
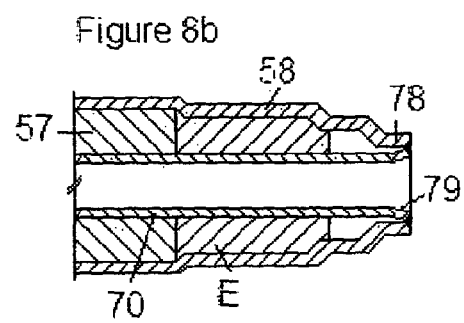

Figure 8a shows a round billet B8 comprising a round hollow steel body 57 inserted in a tube 58. In addition, a second tube 70 is inserted in the bore of the body 57. B8 is suitable for producing round seamless steel tubes or pipes that are internally and/or externally clad with SS or another of the alloys contemplated herein. FIGS. 8b-c are side elevations of an end of B8. The production of B8 is discussed in further detail below.

The tubes illustrated in FIGS. 1 to 8, even when preformed, all usually comprise longitudinally extending welds. Notwithstanding the earlier remarks concerning the vulnerability of welds, it has been found that longitudinally extending welds in the part of the SS tube in which the core bar is located, and when carried out with welding wire of suitable grade, seldom fail during rolling and are reliable enough for the present purpose.

SS tubes that are preformed can be produced in conventional pipe mills. The drawings show that the corners of both the bars and the tubes are radiused. Both before and after swaging (as discussed below) and before rolling, the core bars would not, in reality, fit into the tubes as neatly as shown, particularly at the corners. In billets of a size suitable for most existing mills, normal commercial manufacturing procedures will have the result that there will always be a gap between at least some of the interfacing sides of the core bars and the tubes. It is desirable if not essential to keep the size of these gaps to a minimum. When the tubes are fabricated from plates that are welded together after being placed around the core bars, the gaps may be small enough to avoid the formation of fins in the billet during rolling. This is particularly so if, when the plates are welded, the welds are arranged to penetrate into the core bars.

However, in cases in which the core bar is inserted in a preformed SS tube, the clearance gaps are likely to be quite large. Consider a 14 m length billet comprising a square bar of 90×90 mm nominal cross sectional size inserted in a preformed tube of 120×120 mm nominal cross-sectional size and 8 mm wall thickness. If the components are produced to typical manufacturing tolerances, there could be a nominal gap equal to a maximum of about 14-mm between the bar and the tube at ambient temperature. It has been found in practice that a gap of this size allows square bars and preformed tubes to be used which are visibly not straight. In most instances, bars and tubes will not be distorted to such an extent. Obviously, the force required to insert a solid bar into the tube would increase as the size of the gap between the two decreases. Notwithstanding this, the nominal gap can be significantly reduced, and even eliminated, by using the apparatus and techniques described and illustrated herein. Problems associated with excess peripheral SS that can occur during rolling would thereby be further reduced.

An apparatus for inserting a core in a prefabricated tube is disclosed in Cacace 1933. However, this apparatus also comprises integrated componentry for stretching the tube after insertion of the core to reduce the clearance gaps and, together with the billets that it produces, may be too costly to be justified in some installations, especially if SS tubes are used which have not been annealed and which have become work hardened during manufacture. The force required to stretch such tubes to reduce the clearance gap could be almost double that required for annealed tubes, thereby even further increasing the size and cost of the installation required. An alternative, and probably less costly, apparatus 27 is illustrated in FIGS. 10-13 for lengthening the tube while at the same time reducing the transverse dimensions thereof and hence the clearance gap. Preparatory to using the apparatus, a round core bar 29 is inserted in a round preformed SS tube 30 to form what will be called an assembly 32 best shown in FIG. 9a. The core bar can be inserted by any suitable known technique. In one example, the tube is clamped on a suitable support and the core bar is simply pushed into the tube, typically by a hydraulic ram. This can be achieved without difficulty provided, as noted above, that there is a suitable initial clearance, typically of about 14 mm, between the core bar and the bore of the tube.

In its simplest form, the apparatus 27 comprises a single swaging machine 35. Such machines are commercially available. Techmaflex of France manufactures a machine suitable for the present purpose under the brand name Techmaflex PE 280. This machine has a design that allows the use of floating dies, which are required when swaging shapes that are other than round. Such a machine is schematically illustrated in FIGS. 10-11.

The machine 35 comprises a body 36 provided with a cylindrical passage 37 in which is mounted a die assembly carrying an annular array of eight shoes 38 actuated by hydraulic components housed in the body 36 and arranged equally spaced from each other around a common central axis X. Shoes of various sizes and lengths can be used and are quickly interchangeable. A workpiece such as a metal tube located in the throat 40 of the die assembly will be swaged inwardly by the shoes when they driven under hydraulic pressure provided by the machine 35 towards the axis X.

The machine 35 is mounted between two mechanically driven roller beds 41, 42 that are lined up one with the other and with the throat 40. At the start of the first sequence of swaging operations, the assembly 32 is lowered by a crane onto the roller bed 41 and positioned to the left of the machine 35, as indicated at 43 in FIG. 10a. In the present example, the core bar 29 is initially longer than the tube 30 but is positioned with one end 30' of the tube projecting a short distance from the right hand end 29' of the core bar as shown in FIG. 9a. The difference in length will depend on various factors including the lengths and transverse sizes of the core bar and the tube, the wall thickness of the tube and the length of the shoes 38. All of these factors affect the degree of elongation that the tube undergoes when it is swaged as will be described.

From the position 43, roller bed 41 advances the assembly 32 into the throat 40 to the position shown at 44 in FIG. 10c. In this position, again as viewed in the drawing, the right hand ends of the shoes 38 (which lie in a common plane) are lined up with the right hand end 29' of the core bar. The die assembly is now actuated to drive the shoes 38 radially inwardly. In this movement, the portion 30a of the SS tube that is lined up with the shoes is swaged inwardly and comes up hard against the core bar. This swaging action forces the metal of portion 30a of the tube wall to be squeezed plastically and driven out to either side of the shoes. The effect is that the diameter and also the wall thickness of portion 30a are permanently reduced and portions of the tube on either side of portion 30a become longer. So the distance that the end 30' projects from end of the core bar increases marginally and the entire portion of the tube to the left of portion 30a migrates along the core bar. Portion 30a remains in frictional contact with the core bar when the die assembly is actuated to retract the shoes. The clearance gap between portion 30a and the core bar is eliminated or at least much diminished in the swaged zone.

After the dies are retracted at the end of this first swaging step, the roller beds move the assembly 32 to the position shown 47 in FIG. 10d. In this position, again as viewed in the drawing, the shoes 38 are positioned a short distance to the left of the portion 30a. With the assembly 32 in this new position, the die assembly is actuated to swage a second portion 30b of the tube inwardly, with the same effect on the tube as before. The elongation of portion 30b of the tube may cause the portion 30a to move marginally to the right, carrying with it the core bar due to the frictional grip of portion 30a on the core bar. And the entire portion of the tube to the left of portion 30b again migrates along the core bar.

Continuing in this way, the tube is swaged stepwise, starting from its right hand end. This is necessary because the tube becomes incrementally longer during each swaging step. If the initial length of the tube is correctly chosen, the left hand end 30'' of the tube will project beyond the left hand end of the core bar when the tube has been swaged along the entire length of the core bar. The ends 30', 30'' of the tube will advantageously project equal predetermined distances from the ends 49 of core bar as shown in FIG. 9b. The advantage of this will be explained. The diameter of the projecting ends will remain equal to the original diameter of the tube.

It is necessary that the swaging should be carried out sequentially on adjacent portions of the tube. A swaged portion grips the core bar more or less immovably It is not possible to successfully swage a part of the tube that is located between two portions that have already been swaged. If this is attempted, the part between the swaged portions is unable to elongate and the tube will have an uneven wall thickness in this area.

The degree of elongation that the tube undergoes and the distance D that the ends of the tube finally project from the core bar depend largely on the sizes of the tube and core bar and can be determined by experience. In one example, a billet comprises a tube that is 3050 mm long with an outside diameter of 60.3 mm and wall thickness of 2.74 mm, and a steel core of 51 mm diameter. The tube is typically swaged down to 57 mm diameter, resulting in an elongation of 23-30 mm per meter length of the tube and the distance D will then typically be 75-92 mm. In a 14 m long billet comprising a 120 mm square tube with a wall thickness of 8 mm and a 90 mm×90 mm steel core, the elongation might be 90-100 mm per meter length of the tube and distance D would then be 1260-1540 mm.

An important and unexpected advantage has been found to result from swaging the SS tube against the solid steel core. SS has a greater coefficient of thermal expansion than steel. In the billets produced according to the methods disclosed in Cacace 1932/4, and even Cacace 1933, this resulted in a significant gap between the core and the SS tube of the billets when they were heated to RT. In the present process, the swaging process deforms the SS tube hard up against the outer face of the core. The swaging apparatus used has been found moreover to be capable of applying sufficient force to also elastically deform the core steel inwardly. When the swaging shoes are withdrawn, the steel tends to spring back to its original size but is restrained from doing so completely by the tube. The tube on the other hand has been deformed beyond its elastic limit and has moreover undergone work hardening as a result of the swaging. This has increased its yield stress from approximately 300 MPa to perhaps in excess of 500 MPa. After the swaging shoes are withdrawn it is thus possible that there will be no gap between the core and the tube. Moreover, it is even possible that a "shrink fit" exists between the two due to the greater expansion of the core. Typically, under a circumferential stress of 500 Mpa applied to a billet comprising a tube having an original outside diameter of 100 mm and a 6 mm wall thickness, it is calculated that the diameter would shrink by about 0.26 mm, were the internal core to be removed (such as by machining). The differential in thermal expansion coefficients between steel and SS however tends to cause the SS to expand relatively more than the steel as the temperature increases. This tends to counteract the shrinking effect imposed by swaging, even though the expansion differential between the two metals decreases as temperatures increase. According to Kaye & Laby's National Physical Laboratory Tables of Physical Chemical Constants, a differential of around 2.1 micrometers/meter/C° over the temperature range of 20 C°-1150 C° would cause the tube to expand relative to the core by 0.23 mm thereby almost counteracting the shrink-fit effect imposed by swaging. Even though these calculations may not be precise, the gap, if any, between the core and the alloy tube at RT is likely to be small. This further diminishes the possibility of any oxidising gas penetrating to the interface. When the billet is rolled in the present process, it has been found that bonding between the core and tube occurs early, perhaps even in the second pass through the rolls.

The swaging machine would need to exert a pressure of around 600-800 MPa on the tube and core to produce this result. This is well within the capability of some known swaging machines.

When the first sequence of swaging operations is complete, one or more briquettes of FD metal are placed in the interior of each projecting end 30', 30'' as indicated in FIG. 9b. At least one of such briquettes must be composed of, or contain, a scavenging metal such as titanium, aluminium or magnesium. However, a briquette of steel swarf may additionally be inserted. This is discussed in detail below. In the present example, a single briquette 48 of FD titanium is used since it does not melt when the billet is heated to RT.

Figure 11A:
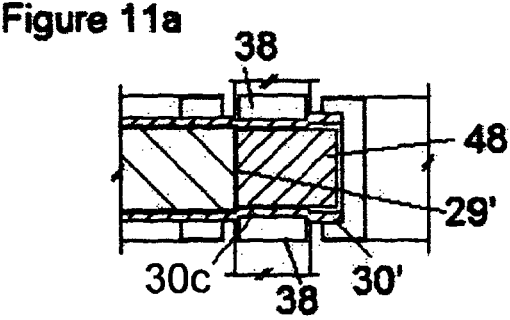
Figure 11B:
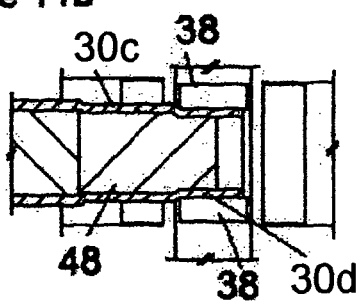
Figure 11C:
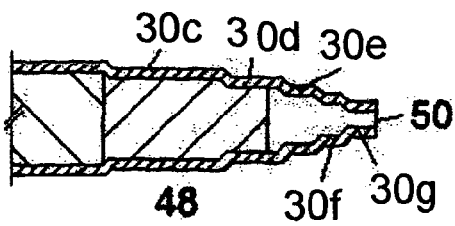

Referring to FIGS. 11*a-c*, a second sequence of swaging is now commenced on one projecting end 30' of the tube followed by a similar sequence on the opposite projecting end 30". In this sequence, the swaging is carried out stepwise as before but on shorter lengths of the tube, starting at the portion 30*c* of the projecting end that is closest to the adjacent end 29' of the core bar. In the simplest set up, the same machine 35 can be used. In each step, the tube is swaged further inwardly than in the preceding step. This is indicated at 30*c*-30*g*. Eventually the internal diameter of the extreme outer end 30*f* of the tube becomes very small as indicated at 50, or even zero.

It is a characteristic of swaging in this way (i.e. when there is nothing in the bore of the tube to restrain the inward movement of the tube metal) that the tube elongates as in the first sequence but also that the wall thickness of the tube end commonly increases. This has the result that, at its extreme end 50, the tube can be squeezed closed, or very nearly so, by the shoes 38. By way of illustration, if the swaging reduces the diameter of the tube by 50%, the wall thickness of a SS tube can increase by as much as 50%. If a SS tube having an initial inside diameter of 50 mm and wall thickness of 6 mm is swaged in this way, its final internal diameter will be about 30 mm and wall thickness will be about 9 mm. The advantage of this feature is described in detail below with reference to FIG. 24 but it is sufficient to mention here that this measure can significantly reduce the need to swage the tube ends to a size that is small enough to weld the billets ends closed.

The length of the projecting ends may also increase significantly as a result of the swaging. This increase can be governed by the degree of swaging but, typically, the end of a 60 mm diameter billet increases from about 75 mm to about 190 mm long after swaging. And the end of a 150 mm diameter billet increases from about 100 mm to about 220 mm after swaging.

Also as discussed below, the cost of the cladding may be reduced owing to fact that the overhanging ends of the tube may be comprised of steel and not SS. In this case, swaging of the ends is particularly advantageous because the uniformly reduced cross sectional shape thereof significantly facilitates the entry of the billet into the rolls and considerably reduces the stress on the circumferential welds that join the overhanging ends to the SS central portion of the tube.

The apparatus described to this point is thought to be suitable for billets of short length, perhaps up to 2 meters. In a high production situation carried out on billets that may, for example, be 14 meters long, the production of the swaged assembly 32 can be speeded up by providing two machines in tandem as shown at 35*a*, 35*b* in FIGS. 12*a*-12*d*. Here, the machines and the roller beds 41*a*, 42*a* are movably mounted. The machine 35*a* is mounted at the right hand end of a carriage 55*a* that also carries roller bed 41*a*. The carriage runs on rails 56. Similarly, machine 35*b* is mounted at the left hand end of a carriage 55*b* that carries roller bed 42*a* and that also runs on the rails 56. The carriages are moved by suitable means such as hydraulic rams, not shown.

A unit 54 comprising a single roller is mounted on a stand that is fixed in place between the carriages. The purpose of this unit is to support the weight of the assembly 32 when the machines 35*a*, 35*b* are at the ends of the assembly 32, as will be explained.

In this arrangement, although the core bar 29 is again initially longer than the tube 30, the tube is initially placed centrally on the core bar, the ends 29*a*, 29*b* of which project equal distances out of the tube, as shown in FIG. 12*a*. Also in this arrangement, the carriages are positioned on the rails so that machines 35*a*, 35*b* are initially located as closely as possible to each other on either side of unit 54. There is nevertheless a significant space between the shoes 38 of the respective machines. Referring to FIG. 12*b*, the assembly 32 is initially advanced through the throats 40 of both machines 35*a*, 35*b* to a position in which the longitudinal centre 45 of the assembly 32 is lined up with the left hand ends of the shoes 38 in machine 35*b*. The machine 35*b* now carries out a swaging step on a first portion 30*h* of the tube. When this is complete, the shoes of machine 35*b* are retracted and the roller beds 41*a*, 42*a* are actuated to carry the assembly 32 to the left to a position in which the shoes 38 of machine 35*b* are lined up with a portion 30*i* to the right of portion 30*h* (FIG. 12*c*). This procedure is repeated until the longitudinal centre 45 of assembly 32 is lined up with the right hand ends of shoes 38 of machine 35*a* (FIG. 12*d*). The machine 35*a* is thus in the correct position to carry out its first swaging step on the portion 30*j* of the tube to the left of the part that has already been swaged; and machine 35*b* is in the correct position to carry out a swaging step on the portion 30*k* of the tube to the right of the part that has already been swaged. Machine 35*a* can continue swaging with the assembly 32 now being advanced to the right until the centre line 45 is positioned midway between the machines 35*a*, 35*b*. Both machines can now simultaneously carry out sequential swaging steps until the entire portion of the tube in which the core bar is located has been inwardly swaged.

Again, the initial length of the tube is chosen so that the tube ends project equal predetermined distance from the ends of the core bar when swaging is complete.

At this stage, after insertion of one or more the briquettes of scavenging metal 48, as already described, the projecting ends of the tube can be simultaneously inwardly swaged by the machines 35*a*, 35*b*, also as previously described.

To speed up production of the billets, it may be necessary to use shoes of different length to carry out the swaging of the central part of the assembly 32 (i.e. the part in which the core bar is located) and the projecting ends. If so, the machines 35*a*, 35*b* can be arranged to swage the central part only. As shown in FIG. 13, the apparatus comprises a further pair of swaging machines 35*c*, 35*d*. The machine 35*c* is mounted in a fixed position and the machine 35*d* is positioned at the right hand end of a third carriage 55*c* carrying a mechanically driven roller bed 42*c*. After the central part of the tube has been swaged by machines 35*a*, 35*b*, the assembly is moved onto the roller bed 42*c* and the carriage 55*c* is positioned so that the respective projecting ends of tube are lined up with the shoes 38 in machines 35*c*, 35*d*. The tube ends can now be simultaneously inwardly swaged by machines 35*c*, 35*d* in the manner described with reference to FIGS. 11*a-c*. After each swaging step the left hand end of the assembly 32 is repositioned in the machine 35*c* by moving the carriage 55*c* and the right hand end of the assembly is repositioned in the machine 35*d* by actuating the roller bed 42*c*.

Once the swaging of the projecting ends is complete, the assembly is conveniently conveyed to a separate work station where the briquettes 48 are inserted and, as described below, the openings at the now tapered tube ends 30', 30" are closed by welded in plugs or plates, if such closing is deemed necessary having regard to the alternative methods of sealing the billet described herein.

It is hereinafter convenient to refer to an assembly 32 as a 'billet'.

One advantage arising from the swaging of the tube is that wastage of tube material can be reduced. The initial length of the tube can be chosen so that, after swaging, the length of the ends of the tube that project clear of the core ends, and that are cropped off from the rolled product, is no longer than is needed to accommodate the briquettes that are inserted in the tube ends, and to ensure that the tube ends are securely closed or sealed. Furthermore, in contrast to the techniques described in Cacace 1933 for stretching the tube, the tube ends are not gripped by the swaging apparatus and are not therefore wasted. For example, as noted above, swaging could increase the length of the tube of a 120×120 mm square billet that is 14 m long by 1.5 m. The tube of a 14 m long billet that is to be stretched by the apparatus described in Cacace 1932 would initially need to project about 100 mm from each end of the core to enable it to be gripped by the stretching apparatus. Swaging would thus save as much as 170 cm (or 12%) of the SS tube.

In a billet in which the components of the tube are welded to the core bar during fabrication as described, it may be unnecessary to swage the central part of the billet inwardly because the clearance gap is sufficiently small. In this case, it will be clear that only the projecting ends of the tube need to be swaged.

For all of the billets shown in FIGS. 1-8, suitable core bars of solid steel can be produced by conventional techniques including, in the particular case of square bars, rolling or continuous casting procedures. The apparatus shown in FIGS. 10a-13 can be used to swage the tubes of all of such billets. Swaging machines of the type described are capable of swaging square billets and, with suitable tooling, even billets of rectangular and some other shapes, such as NNS billets as previously described. The action of the shoes adjusts to the shape of the billet. This has the advantage that the tube can be swaged to take up the shape of a core bar, such as a NNS billet, rail component or axle, whose shape in cross section or along its length is irregular.

For some ferrous products such as tie rods and ground anchors, it may not be necessary for the jacket to be metallurgically bonded to the core bar. However, the conditions of service may well warrant the extra cost of providing such products with a SS jacket that is a close fit around the core. In such cases, the step of heating and rolling, or otherwise working, the heated billet may be omitted. In such cases, it may also be found unnecessary for the tube end to project beyond the ends of the core bar. Although the exposed ends of the core must be sealed, the need to swage the tube ends does not arise.

Before any of the billets shown herein are heated preparatory to rolling or otherwise hot working, steps must be taken to prevent oxidation of the chrome in the alloy tube where the tube interfaces with the steel body. Suitable techniques for this purpose are described below.

In such treatment, it is assumed, at the start, that a billet has been produced as heretofore described and that at least one briquette 48 of scavenging metal such as titanium is placed in the interior of each projecting end 30', 30". The purpose of the briquettes, and their placement in the ends of the billet is discussed in detail with reference to FIGS. 14 and 19-24 in which the briquette or briquettes 48 are generically identified as elements E.

Referring to FIG. 14 and FIGS. 19-24, each billet B is assumed to comprise a core C made up of solid steel. The steel may be mild steel or any suitable grade of steel that is ordinarily more susceptible to corrosion than stainless steel. The core can be solid, as shown, or may be hollow. The core is inserted in a tubular jacket J that, in the present example, is inwardly swaged using the apparatus described with reference to FIGS. 10-13, as appropriate, and represents the tube 30 in the billets previously described. In some of the Figures, the jacket J is illustrated as a tube that is comprised entirely of one of the alloys such as SS contemplated herein. In the other Figures, the jacket J is illustrated as comprising a central portion J1 that is composed of such alloy welded to an outer portion 12 that is composed of steel. The outer portion 12 can be welded to the portion J1 either before or after portion J1 is swaged as previously described. It should be stressed that the differences in construction shown in the drawings are illustrative only and that, unless a contrary intention is indicated, the jackets in all of the Figures can be of either construction.

In each billet there is a zone Z in which there are juxtaposed, interfacing parts of the core C and the jacket J that become bonded together when the billet is heated and rolled.

Each billet is provided with preventive means for excluding from the zone Z gases that are capable of causing oxidation of chrome, copper and nickel in the jacket J. The preventive means includes at least one scavenging metal in the form, usually but not essentially, of a briquette which is generically referred to as an element E in the examples that follow and which is located in the jacket adjacent at least one end of the core C and is thus displaced from the juxtaposed parts in zone Z.

Figure 14A:
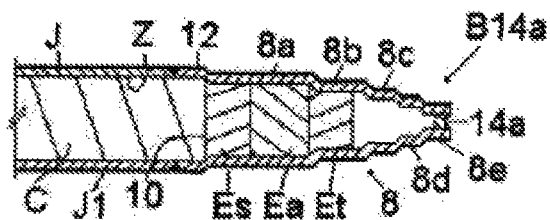

FIG. 14a shows one end of a billet B1 in which the ends 8 of the steel portions 12 of the jacket project clear of the ends 10 of the core and have been inwardly swaged as previously described to a generally tapered shape. In fact, the tapered ends have a stepped appearance as indicated at 8a-e due to the stepwise operation of the swaging machine. In Billet B14a, a set of three elements Es, Ea and Et is placed in the interior of each projecting end 8 before it is swaged. After swaging, a steel plate 14a is located in the outer end 8e and welded in place to seal the jacket. In this example, the opposite end of the billet is similarly arranged so that the jacket J forms a closed metal housing in which the core and the sets of elements E at each end are located and which prevents gases outside the billet from penetrating into the zone Z. These gases include furnace gases and atmospheric gases.

Figure 14B:
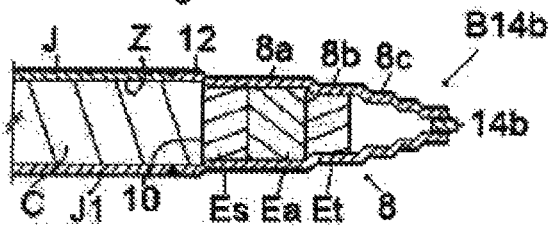
Figure 14C:
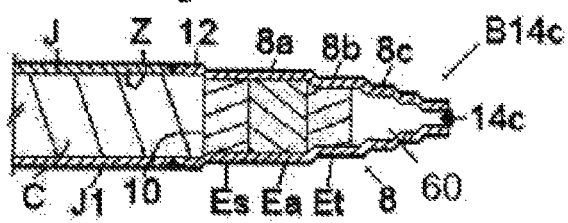

In FIG. 14b, the plate 14a is substituted by a steel plug 14b that is also inserted in the end 8e of portion 12 and welded in place. In FIG. 14c, no such plate or plug is used. The tapered end 8e of portion 12 has simply been welded closed (14c), possibly after being struck with a hammer to reduce the size of the opening left in the end 8e after the swaging operation.

Figure 14D:
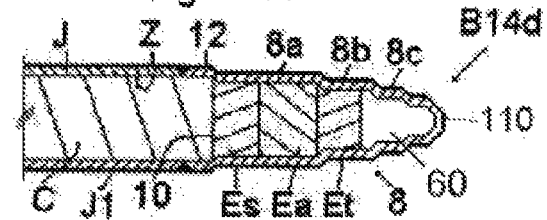

In FIG. 14d, the end 8 of portion 12 is in the form of a closed cap 110 that has a tapered shape formed when the portion 12 is fabricated. In this case, the briquettes E are inserted in the end caps that are welded to the ends of the central portion J1 after the core has been inserted but before portion J1 is swaged. The end caps can be prefabricated by deep drawing followed, if necessary, by swaging and their use eliminates the step of swaging and sealing the ends of the billet heretofore described.

It will be readily understood that the original length of the tube may be chosen so that the end portions of the core C after the tube is swaged onto the core are marginally longer than portion J1 of the jacket. The end caps are fitted over the end portions of the core that protrude from the end of portion J1 and are the welded thereto.

The end caps 110 may also be composed of SS.

The cap of B14d is prefabricated. The portions 12 (shown in FIGS. 14a-c) may also be prefabricated. In the latter case, the end 8 of portion 12 may also be swaged and sealed before portion 12 is welded to the end of the centre part J1 of the jacket. In all of these cases, the scavenging elements E are inserted in the respective portions 12 before they are welded to the SS portion J1 of the jacket. Because of the tapered shape of the ends of these prefabricated portions 12, the welds that join them to the portion J1 of the jacket are less prone to failure during rolling than the welds on a steel end portion 12 that is not tapered.

Figure 14E:
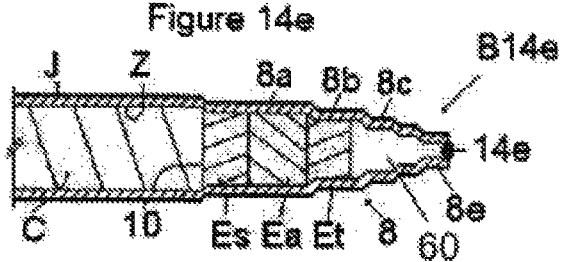

FIG. 14*e* shows one end of a billet B14*e* that is similar to billet B14*a* except that the entire jacket J of B14*e* is comprised of a SS tube that extends to each tapered end 8*e* of the billet. The opening in tapered end 8*e* can be simply welded closed or closed by a welded on SS plate or plug, as before.

When billets having tapered ends of the type shown herein are rolled, there is a tendency for each end of the core to be extruded inside the jacket towards the extreme ends thereof. This causes the scavenging elements E adjacent the extruded end to be driven towards the tube end. In trials conducted on billets in which the jacket comprises steel end portions 12 that have been welded closed and in which there was no space between the elements E and the tube end before rolling, it has been found that there is a tendency for the weld that joins the end portion 12 to the SS jacket J1 to fail. It is believed that this is due to the force exerted on the end portion by the core through the elements E during rolling. It is therefore an advantage to provide an initial space, shown at 60 in the drawings by way of example, to accommodate the outward movement of the elements E during rolling.

In the examples shown in FIGS. 14*a-e*, the element Et is composed of titanium (Ti) in any suitable FD form; Es comprises FD carbon steel but could alternatively comprise FD titanium; and Ea is composed of FD aluminium (Al) or magnesium (Mg) or an alloy of these. In this assembly, the metal of which Ea is composed is thus molten at the rolling temperature ("Rtd") of duplex SS as well ("Rta") as of austenitic SS. Each of the three elements E can be formed by inserting the FD metal, whether or not in briquette form, either directly into the end of the SS jacket before it is swaged or into the prefabricated end portion 12 before it is welded to the SS portion J1 of the jacket.

Each element E acts to prevent oxidation of the chrome in the zone Z as will now be described.

Referring to FIG. 15*a*, the furnace Fn is provided with induction coils including a first set, indicated schematically at I1 and I2, that in a first stage quickly heat the ends of the billet until the elements E reach a temperature of at least 500° C. and preferably 800° C. while the rest of the billet, and in particular the part comprising the alloy portion J1, remains below a temperature below which chrome oxides form in the surface of the jacket in the zone Z. Even at the lower temperature, the scavenging metals in elements Ea and Et bond strongly with both nitrogen and oxygen, the principle gases of which air is composed. The billet initially contains air derived from residual atmospheric air trapped in the billet when it is closed. The elements Ea and Et thus actively scavenge the oxygen and nitrogen from the zone Z to form their equivalent solid oxides and nitrides at each billet end, leaving only inert gases such as argon (Ar). Considering the amount of Ar normally present in the air, a partial vacuum, probably of around 19 mm Hg, results at this stage.

Second sets of induction coils I3 in the furnace are then activated together with the coils I1 and I2 to heat the whole billet to rolling temperature. During this phase, the heating of the steel in the core causes it to decarburise. In the absence of the scavenging elements, the carbon so released would react with any iron oxides on the surface of the core, initially forming $CO_2$ and then, at higher temperatures, CO together with some C. Both $CO_2$ and CO would be oxidising to the chrome in the tube alloy. The scavenging metals however all have a lower FEOF than Cr so are reducing to Cr. They thus combine with any oxygen, including that from the iron oxide, as well as with any CO or $CO_2$ already formed and either prevent oxides of Cr forming or reduce any that have formed.

In an alternative arrangement, the scavenging elements can be heated by several high capacity gas- or oil fired burners that are located adjacent the main furnace in which the whole billet is subsequently heated. The main furnace may be an induction furnace as already described or may also be a gas- or oil fired furnace.

The scavenging elements E in the tapered ends of the billets disclosed herein may heat up more quickly than in the case of billets with non-tapered ends. This is due the smaller diameter of the tapered ends and is a significant advantage of the present invention as it may preclude the need to make special arrangements, as explained above, for heating the billet ends before the central part incorporating zone Z.

The heated billets B14*a-e* (as indeed any of the billets with solid cores described herein) are taken to a conventional mill for rolling into long products such as a rebar shown in cross section at R in FIG. 16 or a flat bar F shown in FIG. 17. Clearly, products of other suitable shapes and sizes, including plates and sections, could be produced by the processes and from the billets disclosed herein.

Referring again to FIGS. 14*a-e*, as long as the jacket remains completely intact, there is no possibility that atmospheric gases can enter the billet through its ends as a result of the cooling that occurs when the billet is removed from the furnace. After the billet has passed through as many roll stands as are needed to ensure that the jacket is bonded to the core, the ends of the now more elongated billet incorporating the parts that house the remains of the scavenging elements are cropped off.

The function of Es when composed of carbon steel is discussed later. It is convenient first to discuss the properties of Ti, Al and Mg together.

One reason that Ti is selected for Et, or as an alternative to the carbon steel in Es in the example described below, is because it has a melting point that is higher than either Rtd or Rta. There is therefore no need to make any provision to keep Et separate from the core as is the case with Al and Mg and some of the other metals that could be used as scavengers. Both Es and Et can therefore act as barriers for containing molten Mg or Al as will be discussed. Notwithstanding the high melting point of Ti, the oxides that it forms in the billet are absorbed into the Ti metal so that the formation of further oxides is not inhibited. Unlike the case when Al and Mg are in the solid phase, Ti is thus able to react continuously with any oxygen that is formed in the billet while it is being heated. Ti therefore does not need to melt in order to function as an efficient oxygen scavenger. Furthermore, Ti is reactive at temperatures even as low as 550° C. As is the case with Al and Mg, dried and substantially cleaned titanium turnings (suitable for briquetting) are readily available due to their high intrinsic value. This may avoid the need for a scrap-processing plant to clean and dry steel swarf if it is to be used for Es.

Of all of the metals named herein as being suitable for use in connection with the present invention, aluminium is the most widely available and the least expensive. It is perceived as being safe to handle. It is an aggressive oxygen scavenger but, in the context of the present invention, its usefulness in this regard may be limited by the fact that its oxide, $Al_2O_3$, once formed, remains in the solid state on the surface of the Al metal and forms a barrier to scavenging. This barrier disappears when the metal melts at about 660° C. This temperature is easily achieved by induction pre-heating the end of the billet. This is one advantage of using Al. The boiling point (hereinafter "BP") of aluminium is well above Rtd and Rta and is thus too high to make aluminium in the gaseous state useful as an oxygen scavenger.

On the other hand, the melting point ("MP") of Mg is about 650° C. and its BP is about 1100° C. In addition, it is a more aggressive oxygen scavenger than Al. Mg is however commonly perceived as being unsafe to handle. This view is expressed in U.S. Pat. No. 6,706,416. Contrary to this view however, information that has been provided by industrial suppliers of Mg suggests that, provided simple, easily achievable, safety steps are taken, the use of Mg for Ea, in the working conditions in which the present invention is put into practice, is unlikely to prove so hazardous as to render the use of Mg unacceptable. It appears that this will certainly be the case when the Mg is in the form of turnings or ribbon and it is possible to be the case even when the Mg is in powder form.

Both aluminium and magnesium form stable oxides, nitrides, hydrides and carbides and, as noted, are active scavengers of atmospheric and other gases. They also have the advantage of low cost. They are most reactive on melting, at which point the surface oxide layers cease to inhibit their scavenging action. The FEOF of each is lower than that of titanium and of course much lower than that of Cr.

For a billet such as B14a-e, there are some disadvantages to the use of an element Ea comprising Al or any of the other metals named herein, including Ti, that do not boil below rolling temperatures. In this case, the gas pressure inside a closed billet at the commencement of rolling will be lower than atmospheric so that air would enter the billet if an end of the tube was to fail before the jacket is bonded to the core during rolling or through pinhole leaks in the sealing welding. In the event of failure of the tube end, however, or when the tube ends are left open, the elements E would preferentially scavenge oxygen before scavenging nitrogen from any incoming atmospheric air. Since air comprises 78% nitrogen and 21% oxygen, the vacuum in the jacket would be displaced essentially by nitrogen, which is an advantage because nitrogen is relatively inert to Cr at high temperatures. The nitrogen would tend to prevent the entry of further atmospheric gases, including oxygen, before the elements E cease to have any scavenging effect. In the latter case, the problem is addressed by the modification to the billet, described below with reference to FIG. 19.

Conversely, a significant advantage of the use of Mg for Ea is that, when Mg is raised above its boiling point, a positive gas pressure is created inside the billet, replacing the partial vacuum that it creates in the billet as a result of forming solid oxides. Mg vaporises at 1100° C. at atmospheric pressure but at a lower temperature under the partial vacuum. At RTd the pressure of the vapourised Mg in the billet is close to atmospheric. At RTa the pressure of the vapourised Mg in the billet is above atmospheric. The possibility of entry of air during rolling if the jacket fails is thereby much diminished.

The vaporised Mg acts as a strong reducing gas for any CO and $CO_2$ that might occur in the billet. CO starts to form from about 780° C. and only reduces chrome oxides above 1225° C.

The element Ea may also comprise an alloy of aluminium and magnesium. As is known, the BP of such an alloy can be controlled by adjusting the proportions of the constituent metals. Thus the BP of the alloy can be made higher or lower than rolling temperatures, as desired. The ratio of Al to Mg can be chosen to cause the alloy to vaporise anywhere between 1100° C. and 1260° C. In essence, when Mg is used as the scavenger, reliance is placed on the Mg vapour, rather than CO, to reduce Cr oxides.

It may prove unacceptable in practice to use elements composed of a metal such as magnesium or an alloy thereof that vaporises below RT of the billet concerned, because the vapour that penetrates into the zone Z may leave unacceptable inclusions at the interface in the finished product. On the other hand, the same elements may be acceptable for use in billets whose RT is below the temperature at which the elements vaporise. Experience will determine the circumstances in which such elements can be used.

Because Mg and Al melt at temperatures lower than rolling temperatures, it is considered necessary to prevent molten Mg and/or Al, when used for Ea in billet B14a-e, from reaching the interface of the core and the SS jacket. This is achieved by the presence of Es which, whether it is comprised of FD steel or Ti, does not melt below rolling temperatures and acts as a barrier to the molten metal. This is one function of Es. If FD steel is used for Es, it is preferably of medium- to high-carbon grade, which typically contains 0.4%-1% of carbon. Graphite could be added to the FD steel to increase the carbon content if necessary. At elevated temperatures, CO will be evolving from the FD steel, any graphite present and also from the steel core. At RTa, CO is reducing to any oxides in the chrome. Even at RTd, CO may be reducing to Cr in the presence of Al or Ti.

When Es is formed from Ti, Es not only acts to scavenge oxygen that is initially present, or that evolves, inside the zone Z, but also helps to scavenge atmospheric oxygen before it gets into the zone Z through cracks or pinholes in the welding or jacket failure, or when the jacket is substantially sealed by an element E' of compressed FD steel as explained below.

A modified element Es' is shown in FIG. 25. This element could comprise Ti in a suitable FD form such as shavings shown schematically at 80, mixed with steel, also in the form of wire or swarf or other suitable FD form as shown schematically at 82. It has however, also been found useful to provide an element Es' in which the scavenging metal is Al. This can be in powder form in quite heavy concentration, finely dispersed throughout the FD steel so as to prevent the melting Al from being concentrated into puddles and in contact with the SS jacket. This has been shown to reduce the risk of the Al burning through the jacket. It also mitigates any risk of Thermite effect when the Al comes into contact with atmospheric air when the element Es' is used as a swaged plug similar to the element E' described below.

In order to assist the removal of atmospheric oxygen from any of the closed billets described herein, it may be advantageous to evacuate the billet by connecting one or both ends of the billet to a vacuum pump P prior to any heating. This is shown schematically in FIG. 15b. Before the billet is transferred to the furnace, the pump is disconnected from the billet, and the apertures in the billet by which the pump is connected are closed. The means of evacuating the billet in this way are well known and need not be described in detail.

Instead of evacuating the billet, or in addition thereto, the pump P could be of a type arranged to pump an inert gas such as Ar into the billet to displace the residual air.

In B14a-e, the elements Ea, Et and, at temperatures close to RT, Es each serve as means to scavenge oxygen, particularly from air that is initially present or that may get into the billet in any of the ways previously described. The potential for oxidation of the Cr to occur as a result of such failure is exacerbated if the temperature of the interior of the billet and the incoming air is lower than 1225° C. The modification to the billet, shown in FIG. 19, addresses this problem.

Figure 19:
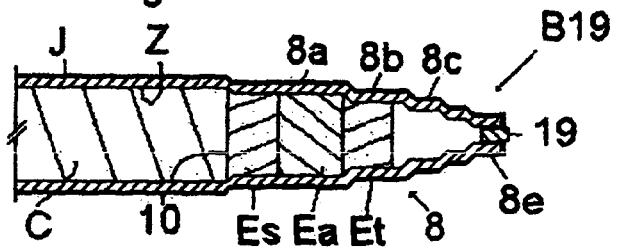

FIG. 19 shows one end of a billet B19 that is provided at each end with three elements Es, Ea and Et that, subject to what is said below about Ea, are comprised of the same metals, and serve the same functions as, the identically named elements in B14a-e. The tapered ends of B19 are initially sealed by a temperature-dependent plug 19 that melts and allows the billet to be vented inside the furnace at a temperature which can be preselected but is in any case not less than 1225° C. A suitable material for such a plug is 30% copper-nickel which fully melts at 1237° C. When the plug melts, vacuum conditions in the billet cause hot oxidising furnace gases, which are normally at temperatures of around 1300° C. and in any event well above 1225° C., to be rapidly sucked into the billet. These furnace gases would pass through Et, Ea and Es and thus through three layers of reducing and scavenging metals. First through the outer elements Et and Ea which are primarily aggressive oxygen scavengers. Any remaining oxygen or $CO_2$ when passing through the final element Es would be converted into CO, with an increase in pressure due to the formation of two CO molecules for every molecule of $CO_2$ or $O_2$. The CO entering the zone Z at temperatures well above 1225° C. would have a reducing effect on any Cr oxide traces still present in zone Z.

The elements E inserted into each end of billet B19 also provide additional protection as a precaution against oxidation occurring in the zone Z in the event of failure of the jacket ends during rolling. The elements therefore serve as CO converters not only when the plug melts but also if the jacket should fail during rolling.

In one case, assume that Ea in FIG. 19 consists of Mg instead of aluminium and that the tapered ends of B 19 are initially sealed by the temperature-dependent plug 19 abovementioned that melts at a preselected temperature of between, say, 1150° C. and 1225° C., allowing the billet to be vented inside the furnace. In these circumstances, the Mg vapour will already have vaporised at a temperature lower than 1100° C. under the partial vacuum previously created by the scavenging action of Et and Ea. The Mg vapour will now be at a positive gas pressure. At RTd the pressure of the vapourised Mg in the billet is almost atmospheric. At RTa the pressure of the vapourised Mg in the billet is above atmospheric. When the plug melts, allowing the billet to vent, the Mg vapour, being at a higher pressure than the furnace gases, would prevent any oxidising gases from entering the billet. The vapour would merely burn (oxidise) at each tapered end. This positive pressure would continue even during initial rolling until the billet temperature falls below 1100° C. The possibility of entry of air during rolling if the jacket fails would be thereby much diminished.

In what follows, it is not considered necessary to repeat in every instance the description of the scavenging elements in some arrangements thereof and such elements may be identified by the simple letter E.

Notwithstanding that a billet contains elements comprising the scavenging metals, particularly aluminium and titanium, that have so far been suggested, it is possible that, after the ends are preheated, conditions in the interior of the billet may still allow some oxidation of the Cr, despite the fact that the atmospheric air has been scavenged or evacuated from the billet prior to heating.

Figure 20:
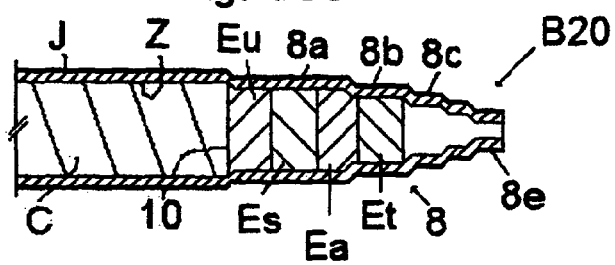
Figure 21:
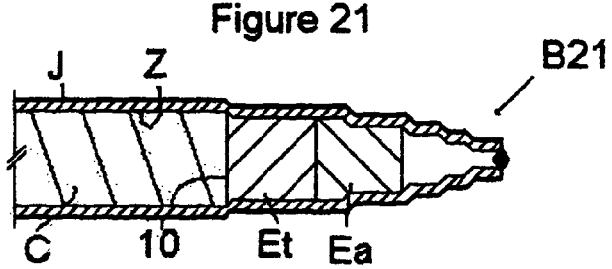
Figure 22:
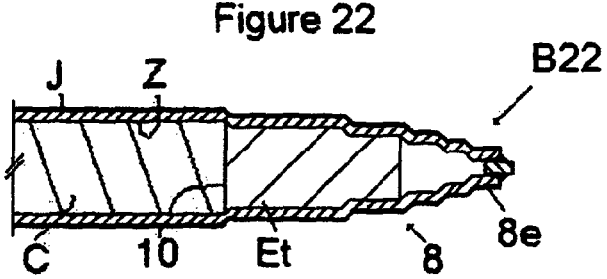

FIG. 20 shows the swaged end of a billet B20 that addresses this issue. B20 comprises an assembly of four elements Eu, Es, Ea and Et. The latter three can be identical to those already described and serve the same respective functions. The sealing plate or plug previously described can be omitted. Eu is sandwiched between Es and the end 10 of the core and is a briquette comprising $NH_4Cl$ or urea. The usefulness of this assembly is that the $NH_4Cl$ or urea dissociates at a low temperature, as described in the earlier patents, and forms large volumes of gas that are able to escape from the billet through the opening in the tapered end of the jacket, since Es, Ea and Et can be made sufficiently porous to allow this to happen.

These gases displace residual air in zone Z of the billet. The dissociation of $NH_4Cl$ or urea commences at a temperature below 200° C. and continues until the temperature reaches somewhere below 600° C. at which point the $NH_4Cl$ or urea are spent and the flow of gases out of the ends of the billet ceases. The billet B20 does not therefore need to be evacuated or purged to remove the atmospheric gases inside the billet. Although the porosity of Es, Ea and Et also allows atmospheric air to be drawn into the billet when the ends are being heated, Es, Et and the molten constituents of Ea scavenge any oxygen that may remain, or evolve, in the billet and also scavenge oxygen and other gases in the air before they can penetrate into the interior of the billet.

In the billets B14a-e, the jacket J that houses the core body and is closed to the atmosphere provides means for preventing oxidising gases from outside the billet penetrating to the zone Z until the interfacing parts of the core and SS jacket become bonded together. In a billet such as B20, this means is effectively provided by the element Eu in combination with an array of scavenging elements such as Es, Ea and Et. Eu is active in the lower temperature ranges to scour oxidising gases from the zone Z and the scavenging elements not only allow these gases to escape but also provide a sufficient sealing action at the lower temperatures to stop atmospheric or furnace gases from penetrating to the zone Z. As the temperature rises, the scavenging elements become more active and, although atmospheric and furnace gases may be able to penetrate to the zone Z, any oxygen in these gases is scavenged by Es, Ea and Et before they do so.

It may be found unnecessary to provide as many as three scavenging elements in a billet. For example, the element Et in B14a-e may be active enough to allow the element Ea to be omitted as shown in the billet B21 in FIG. 21. Since Et does not melt, the barrier element Es may also not then be needed as shown in the billet B22 in FIG. 22.

Figure 22A:
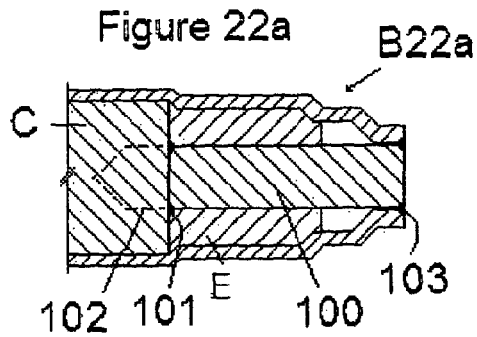
Figure 22B:
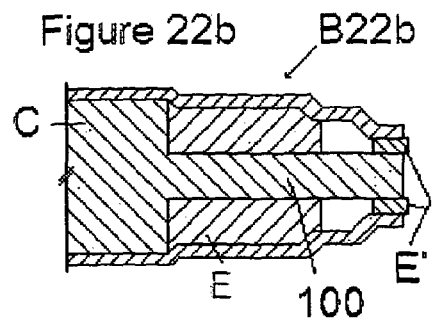

Further variations are shown in FIGS. 22a-b. The core comprises a cylindrical projection 100 in the form, in this example, of a bar of solid steel or SS mounted on the end of the core C of billet B22a by welding (as indicated at 101), and/or by being pressed with interference fit into a hole drilled in the core (as indicated in dotted outline at 102) or in any other suitable way. Alternatively the projection 100 may be integral with the core, being formed by machining, or otherwise removing, the metal at the periphery of the core surrounding the projection as indicated in FIG. 22b. An annular element E of scavenging metal, preferably of FD Ti but alternatively an array of such annular elements in any suitable arrangement as described herein, is placed over the projection 100 before the tube end is inwardly swaged, and welded to, the end of the projection as shown at 103. The billet B22b in FIG. 22b is similarly constructed except that the tube end is not welded to the projection 100 but swaged over an element E' the composition and function of which is the same as that of the elements E' described below. The projection 100 reduces the degree of inward swaging applied to the tube end and helps to support the tube end, thereby reducing any tendency thereof to fail, during rolling.

Figure 4A:
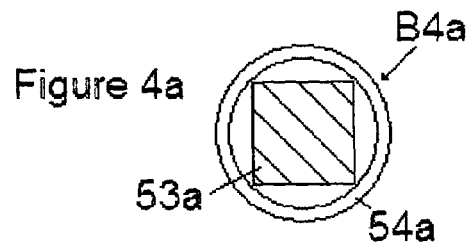

Referring to FIG. 4a, the billet B4a comprises a square core 53a inserted in a round tube 54a. A billet so constructed has the advantage that the core is relatively easy to insert in the tube. After the central part of the tube has been inwardly swaged against the square core, the provision of the projection 100 reduces the distance that the projecting ends of the tube must be inwardly swaged.

The tubes of the billets B20-B22 may be formed entirely from SS or one of the other alloys contemplated herein as illustrated or be provided with steel end portions as previously described. Similarly, the ends of these billets may be welded closed or closed with welded-on plugs or plates.

The elements E might typically be 10-150 mm thick. This is however by way of example and they could be of any suitable thickness determined by trialling.

It will probably always be necessary to prevent the raw scavenging metals from the elements E being present in the zone Z before the billet is heated. In the end product, the residue of any significant quantity of these metals is likely to be deleterious to bonding between the interfacing parts of the core and jacket and the end parts of the billet that contain such residue after rolling are in any case discarded. It is therefore thought that the scavenging elements E should initially be located in a position that is separate from the faces of the core and jacket.

There are other metals that have a lower FEOF than Cr and Ni and that therefore might be used instead of Al, Mg or Ti. Although it appears at present that these other metals are less likely to be used, this is not discounted. These other metals include zirconium lithium, calcium, silicon, vanadium, manganese and uranium.

Figure 23:
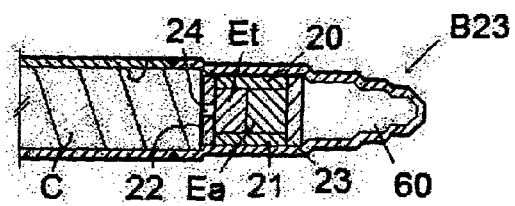
Figure 23A:
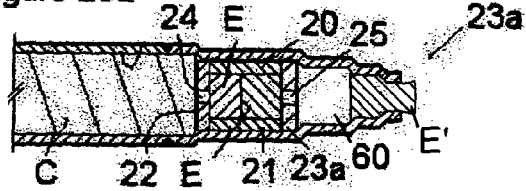

Yet another possibility is illustrated in FIG. 23. The billet B23 contains one or more elements E in substantially the same arrangements as any heretofore described. However, the elements are not placed directly in the tapered ends of the jacket but are pre-packed instead in a cartridge 20, which can be of mild steel. In this example, two such elements Ea, Et are illustrated, the functions of which are identical to those previously described. The cartridge is a close fit in the parallel part of the jacket end before it is swaged and comprises a longitudinally extending, tubular outer body 21 with end plates 22, 23 at its inner and outer ends. The end plates are welded to, or integral with, the body 21 so that the joints between the plates and body 21 are sealed. The end plate 22 is located against the end of the core C and is provided with a central aperture 24 to put any gas in the interior of the billet in contact with the scavenging element or elements E in the cartridge. As necessary and depending on the nature of such elements, the plate 23 may have an aperture or may be provided with a plug that melts at a predetermined temperature or alternatively may have no aperture, all as previously described. In the first of these cases, the tapered end of the billet is open and the aperture in end plate 23a is shown at 25 in FIG. 23a.

The inner end plate 22 serves, in the first place to hold the element or elements E in place in the cartridge. Where one of such elements is composed of a scavenging metal that melts below rolling temperature as previously described, each end plate in the cartridge can also act as a barrier for holding the molten metal. The quantity of metal could be chosen so that, when molten, its upper surface lies below the apertures 24, 25. This would help prevent molten Al or other metal from spilling out of the cartridge and finding its way into the gap between the core and the jacket when the hot billet is being handled.

Figure 24:
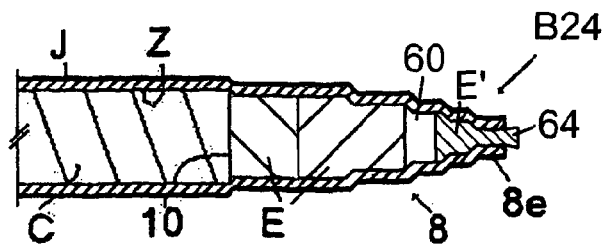

In another variation shown in FIG. 24, the billet B24 comprises a briquette E' of FD steel or other suitable material does not melt or burn at RT. E' is placed in the end 8 of the tube in such a position that, after the tube end is inwardly swaged, E' is compressed and one end 64 thereof projects clear of the end of the tube. Additional elements E are placed between E' and the core end in any suitable alternative arrangement heretofore discussed with at least one of the elements E being of a scavenging metal. A space 60 may be left between E' (or these other elements E) and the core end, if this is found to be necessary. The degree of inward swaging must be such that the FD material of which E' is composed is sufficiently compressed as to substantially seal the open end of the tube to the extent that, when the billet is heated prior to rolling, the oxygen in any air that penetrates the seal is scavenged by one of the other elements E. In the present example, if E' is composed of FD steel, it will typically need to be compressed to at least about 75% of the relative density of solid steel. It has been found that this degree of compression is achievable by swaging the ends of the tube but would not be achievable by the crimping apparatus disclosed in the earlier U.S. Pat. Nos. 5,051,315, 6,706,416 and Cacace 1934, previously mentioned. The absence of any welding needed to close the tube end significantly reduces the cost of preparing the billet.

As noted, Al powder may be interspersed throughout the FD steel of E' in a lattice structure.

Consider a billet B24 that comprises an element Ea and/or Et: as the ends are preheated, Et and/or Ea become reactive from 550° C., whilst E' remains substantially impervious to air. Both Et and Ea have a greater affinity for oxygen than nitrogen at temperatures lower than 880° C. They thus preferentially scavenge oxygen inside B24 to create a partial vacuum with only nitrogen remaining. Even if E' becomes porous when the billet is heated to RT, Et and/or Ea will still preferentially scavenge oxygen from any entering atmospheric gases, with only nitrogen and argon remaining, until internal and external gas pressures equalize. The provision of sufficient quantities of scavenging metal in Et and Ea will ensure that these do not become spent at over 880° C. after also scavenging the nitrogen in the billet, thus leaving only argon. Before Et and Ea become fully spent, they will continue to preferentially scavenge oxygen even though they may cease to react with nitrogen until the nitrogen gas inside the billet is in pressure equilibrium with external gases.

Another advantage of swaging the tube end against an element E' that is initially of sufficient size and relative density, is that the tube end does not have to be inwardly swaged as much as if it was closed by a welded-in plug or the like as previously discussed. This avoids the excessive deformation of the tube end that leads to work hardening of the SS and consequent possible failure thereof.

FIGS. 8b-g are side elevations of one end of a billet B8 as already mentioned. As will become clear, in order to work the billet B8 to produce a seamless pipe using known methods and apparatus, it is necessary for the billet to be provided with both the internal and external tubes 58, 70. The tube 70 in the bore of the hollow body 57 of B8 may be of steel or SS. In the latter case, the tube is preferably seamless and the product produced from B8 will be a seamless steel pipe with an internal cladding of SS. Similarly, the tube 58 in which the body 57 is housed is may also be of steel or SS. In the latter case, the product produced from B8 will be a seamless steel pipe with an external cladding of SS. If both of the tubes 58, 70 are of SS, the product will be a pipe with both an internal and an external cladding of SS.

If one of the tubes 58, 70 is of steel, it becomes bonded to the core body 57 without trouble when the heated billet is rolled.

Both of the tubes initially project from each end of the body 57 sufficiently to enable at least one element E, which is of annular shape, to be placed between the respective projecting ends 78, 79 of the tubes, arranged in the same way as in any of the billets heretofore described. Referring to FIG. 8b, each projecting end 78 of the outer tube 58 is inwardly swaged. This can be done, for example, by the apparatus shown in, and described above. However, in most instances, it will be necessary to arrange that the projecting end 79 of the inner tube is outwardly swaged, or at least not constricted by, the swaging. To this end, referring to FIG. 8d, self-centering, cone shaped blocks 81 are placed against each tube end 79 and drawn together by nuts 83 mounted on the threaded ends of a strong rod 84 that passes through the tube 70 and through the centre of each block 78. The blocks serve to at least prevent the tube ends 79 from being squeezed inwardly when the outer tube 58 is swaged. If it is necessary to apply a greater force to the blocks in order to effect outward swaging of the tube ends 79, an annular hydraulic jack 85 may be placed between the block 81 and nut 83 at at least one end of tube 70.

Figure 8D:
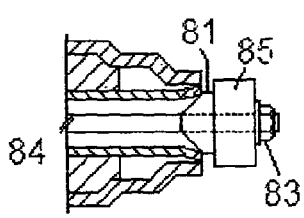
Figure 8E:
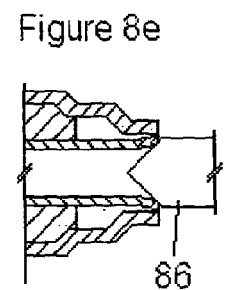

In an alternative arrangement shown in FIGS. 8e and 13, hydraulic rams, only the heads 86 of which are shown, may be anchored in place adjacent each end of the apparatus shown in FIG. 13. Like the blocks 81, the heads 86 are cone shaped and not only centre themselves on the tube ends 79 but also swage the tube ends outwardly under the force of the rams. This arrangement is quicker that the use of the blocks 81 and is better suited to a high production installation.

The tube ends 78, 79 are swaged until they are close enough to each other to be welded together to seal the billet closed. Alternatively, the billet may be sealed by annular elements E', of FD steel as described above, that are held in placed between the tube ends 78, 79 after they are swaged together. Of course, FD Ti or Al may be admixed with the FD steel of the elements E', as before.

In one example, the body 57 is a pierced billet produced in a piercing mill of, for example, the well known Mannesman type. This billet is 8 m long with an outside diameter of 140 mm and inside diameter of 118 mm so that the wall thickness is 11 mm. The internal tube 70 is an internally shot blasted SS pipe, 8.15 m long with an outside diameter of 114 mm and a wall thickness of 3 mm. The external tube 58 is a carbon steel pipe, 8.15 m long with an inside diameter of 144 mm and a wall thickness of 3 mm.

The swaging machines have sufficient tonnage capacity to compress the centre portions of all of the three components of the billet B8 beyond their elastic limits and in fact to eliminate clearance gaps therebetween. It is thought that all although all of the components will elongate, the external pipe 58 will elongate the most.

Experience will enable the original lengths of the two pipes 58, 70 to be adjusted so that the overhangs after swaging will be equal.

After the ends are swaged and closed as described, the billet B8 can be heated and passed through existing apparatus used for making seamless steel pipe of this size. In one example, as will b well understood, such apparatus could include a plug rolling mill, a reeling machine and a sizing machine.

The remnants of the elements E are removed when the ends of the billet are cropped off after the billet undergoes an initial rolling or is otherwise worked to cause both of the pipes 58, 70 to become bonded to the steel body 57. Billet B8 is suitable for producing a seamless steel pipe internally or externally clad with SS or one of the other alloys contemplated herein. FIG. 18 illustrates a typical internally clad such pipe PR if the component 68 is considered as being composed of the alloy and the component 67 is considered as being composed of steel.

The plug rolling mill and reeling machine both require the use of mandrels in the rolling operation. The head of the mandrel is a close fit in the bore of pipe 70 and this is the reason why it is necessary to avoid any constriction in the bore of the internal pipe 70.

In all cases described herein where a cartridge is used, the cartridge can be formed of carbon steel, which is less prone to cracking if the cartridge cools excessively during rolling or otherwise working.

The invention claimed is:

1. A method of producing a billet which can be heated and worked to form a metal product, the billet comprising a metal tube and a solid steel body in the tube, the tube having a transverse size that has a portion that interfaces with the solid steel body, the method comprising the steps of:
   placing at least one scavenging metal in the tube adjacent an end of the solid steel body;
   carrying out a swaging operation on the tube that causes the transverse size of at least the portion of the tube that interfaces with the solid steel body to decrease; and
   sealing the tube to prevent penetration of oxidizing gases from outside the billet to the scavenging metal.

2. A method according to claim 1, in which the tube is composed of an alloy selected from the group consisting of stainless steel, nickel-chrome, nickel-copper and copper-nickel alloys.

3. A method according to claim 1, wherein the swaging operation causes the length of the tube to increase.

4. A method according to claim 3, in which at least one portion of the tube that is swaged is located in a part of the tube that projects clear of the end of the solid steel body and is swaged to a transverse size that is smaller than that of the end of the solid steel body.

5. A method according to claim 4, wherein the swaging operation causes the wall thickness of at least one of the portions to increase.

6. A method according to claim 1, in which the solid steel body has a bore in which is placed a second metal tube, at least one of the tubes being composed of an alloy selected from the group consisting of stainless steel, nickel-chrome, nickel-copper and copper-nickel alloys, the method further including the steps of placing said at least one scavenging metal between the two tubes adjacent an end of the solid steel body, and sealing the tubes to prevent penetration to the scavenging metal of oxidizing gases from outside the billet.

7. A method according to claim 6, in which the tube in which the solid steel body is inserted is composed of steel and the second metal tube is composed of an alloy selected from the group consisting of stainless steel, nickel-chrome, nickel-copper and copper-nickel alloys.

8. A method according to claim 6, in which the tube in which the solid steel body is inserted is composed of an alloy selected from the group consisting of stainless steel, nickel-chrome, nickel-copper and copper-nickel alloys and the second metal tube is composed of steel.

9. A method according to claim 6, in which the swaging operation is carried out on a part of the tube in which the solid steel body is inserted and that projects clear of the end of the solid steel body.

10. A method of producing a metal product, comprising the steps of:
   providing a billet comprising a metal tube with a transverse size that allows a solid steel body to be inserted into the tube and that is composed of an alloy selected from the group consisting of stainless steel, nickel-chrome, nickel-copper and copper-nickel alloys, and the solid steel body in the tube;
   placing at least one scavenging metal in the tube adjacent an end of the solid steel body;
   carrying out a swaging operation on the tube that causes the transverse size of at least a portion of the tube to decrease;
   sealing the tube to prevent penetration to the scavenging metal of oxidizing gases from outside the billet; and after the swaging and sealing steps, heating the billet, and working the billet to form a product having a cladding composed of the alloy.

11. A metal product formed by a method as claimed in claim 10.

12. A method of producing a metal product, comprising the steps of:
providing a billet comprising a metal tube with a transverse size that allows insertion of a steel body, and the steel body in the tube, the tube having a bore in which is placed a second metal tube, at least one of the tubes being composed of an alloy selected from the group consisting of stainless steel, nickel-chrome, nickel-copper and copper-nickel alloys;
locating at least one scavenging metal between the two tubes adjacent an end of the steel body;
carrying out a swaging operation on the tube in which the solid steel body is located that causes the transverse size of at least a portion of that tube that interfaces with the steel body to decrease;
causing the tubes to be sealed to prevent penetration to the scavenging metal of oxidizing gases from outside the billet;
heating the billet; and
working the billet to form a product having a cladding composed of the alloy.

13. A method according to claim 12, in which the swaging operation is carried out a part of the tube in which the steel body is inserted and that projects clear of an end of the steel body.

14. A method according to claim 12, in which the tube in which the steel body is inserted is composed of steel and the second metal tube is composed of an alloy selected from the group consisting of stainless steel, nickel-chrome, nickel-copper and copper-nickel alloys.

15. A metal product formed by a method as claimed in claim 14.

16. A method according to claim 12, in which the tube in which the steel body is inserted is composed of an alloy selected from the group consisting of stainless steel, nickel-chrome, nickel-copper and copper-nickel alloys and the second metal tube is composed of steel.

17. A metal product formed by a method as claimed in claim 16.

* * * * *